United States Patent

[11] 3,582,021

| [72] | Inventor | David R. Pender |
| | | 1018 Marion St., Columbia, S.C. 29201 |
| [21] | Appl. No. | 849,679 |
| [22] | Filed | Aug. 13, 1969 |
| [45] | Patented | June 1, 1971 |

[54] VERTICAL TAKEOFF AND LANDING AIRCRAFT AND METHOD OF OPERATION
11 Claims, 7 Drawing Figs.

[52] U.S. Cl. .................................................. 244/7,
244/2, 244/17.19
[51] Int. Cl. ..................................................... B64c 27/22,
B64c 37/00
[50] Field of Search .......................................... 244/7, 2, 6, 17.19, 139, 140, 13, 58

[56] References Cited
UNITED STATES PATENTS
2,497,590   2/1950   Drill ............................ 244/139
2,629,570   2/1953   Carnahan ..................... 244/7
3,119,577   1/1964   Andrews ...................... 244/7
3,185,408   5/1965   Higgins ........................ 244/7
FOREIGN PATENTS
1,003,057   9/1965   Great Britain ............... 244/7

*Primary Examiner*—Milton Buchler
*Assistant Examiner*—Carl A. Rutledge
*Attorney*—B. P. Fishburne, Jr.

ABSTRACT: A generally conventional fixed wing aircraft has a lifting rotor pivoted thereto near the aircraft tail on a transverse or pitch axis. During takeoff, power is shunted to the lifting rotor and the aircraft is lifted substantially vertically by its tail to a practical elevation. Power is then diverted from the lifting rotor to the normal propulsion means of the aircraft and after first dropping downwardly, the aircraft levels off and flies in a conventional manner as the lifting rotor is collapsed and drawn longitudinally into a storage chamber within the fuselage through a rear opening in the longitudinal chamber.

PATENTED JUN 1 1971

INVENTOR
DAVID R. PENDER

BY B. P. Fisher Jr.

ATTORNEY

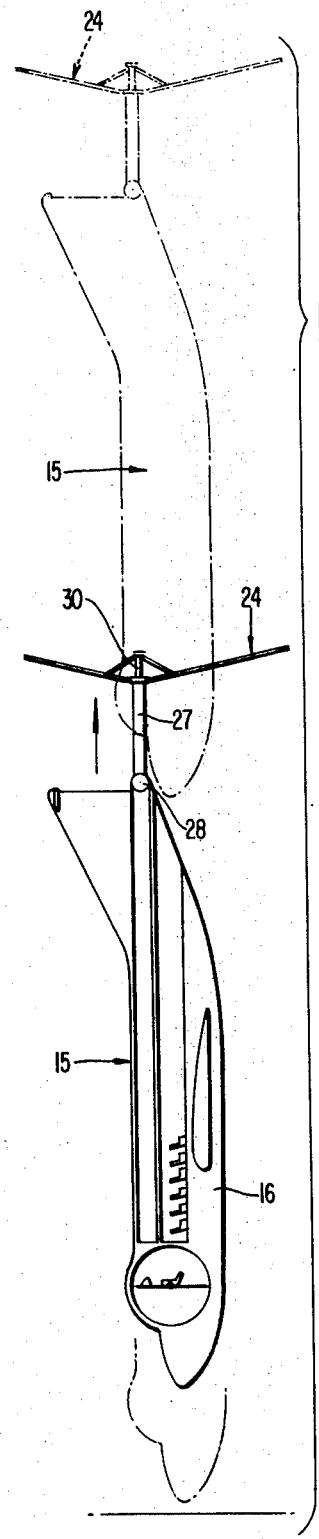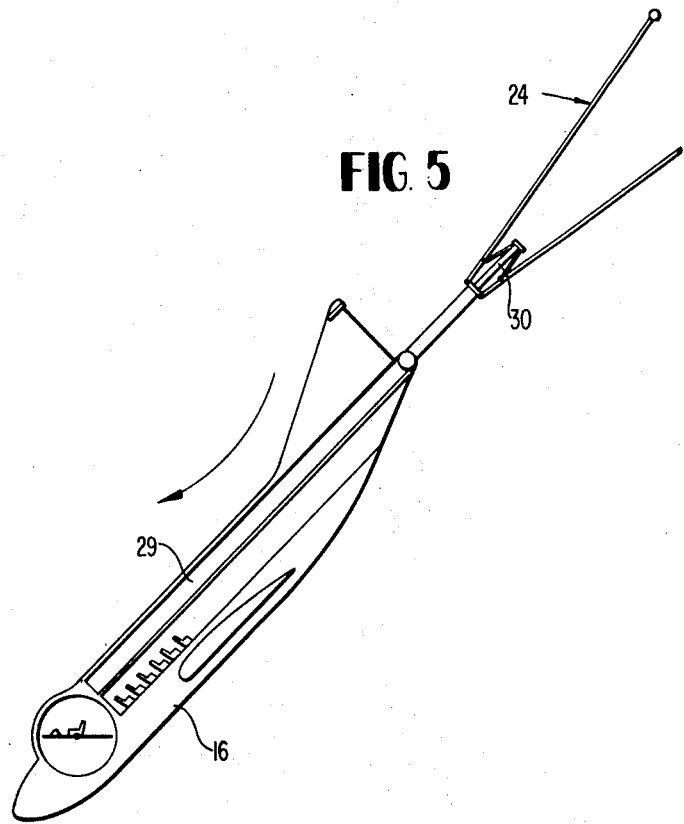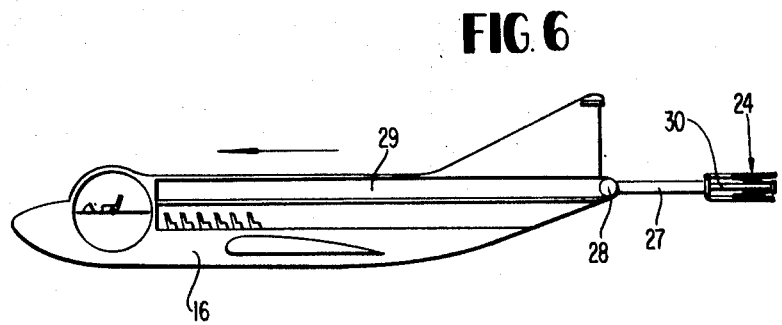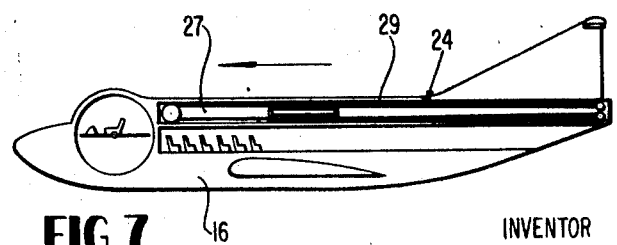
INVENTOR
DAVID R. PENDER
BY
ATTORNEY

VERTICAL TAKEOFF AND LANDING AIRCRAFT AND METHOD OF OPERATION

A variety of classes of vertical takeoff and landing aircraft are known in the prior art and none of these has proven to be entirely satisfactory as evidenced by the fact that none has been adopted on a commercial scale. Some of the prior art craft are lifted nose first from a tail sitting position and still others have been proposed having completely unconventional saucer designs and the like. Some of the craft employ lifting rotors including folding rotors while others employ counter rotating propellers, ducted fans and various jet propulsion systems which are convertible from vertical to normal horizontal flight.

It is a known fact that air passengers will resist a radical new design which departs too abruptly from the conventional, both in appearance and performance, and this is one of the many difficulties in achieving commercial success with vertical takeoff and landing aircraft. Nevertheless, there is a great need for such an aircraft in view of the critical lack of runway capacity to meet the needs of the growing industry throughout the entire world. A truly successful short takeoff or vertical takeoff airliner would be a great boon to the industry now and in the future.

In light of these problems and requirements, the present invention has been devised to satisfy the need for a vertical takeoff and a landing craft and method which are thought to be entirely practical, safe and relatively economical and, most importantly, can have its power components applied to a largely conventional fixed wing aircraft, such as a modern jet airliner. Except for the fact that the craft will be lifted vertically by its tail through a unique rotor structure, the passengers will experience a normal flight sensation from terminal-to-terminal in an aircraft which is substantially conventional based on modern-day standards.

Various detailed features and advantages of the invention will become apparent during the course of the following description.

DESCRIPTION OF DRAWING FIGURES

FIG. 4 is a further elevational view of the aircraft in a vertical attitude suspended from its tail during lifting.

FIG. 5 is a side elevation of the aircraft as it is converting to normal horizontal flight while the lifting rotor is folding in a controlled manner.

FIG. 6 is a side elevation of the aircraft in horizontal flight with the lifting rotor completely folded and not yet retracted into its storage chamber.

FIG. 7 is a similar side elevation of the aircraft in horizontal flight showing the lifting rotor fully retracted and stored.

DETAILED DESCRIPTION OF PREFERRED EMBODIMENT

Figure 1:
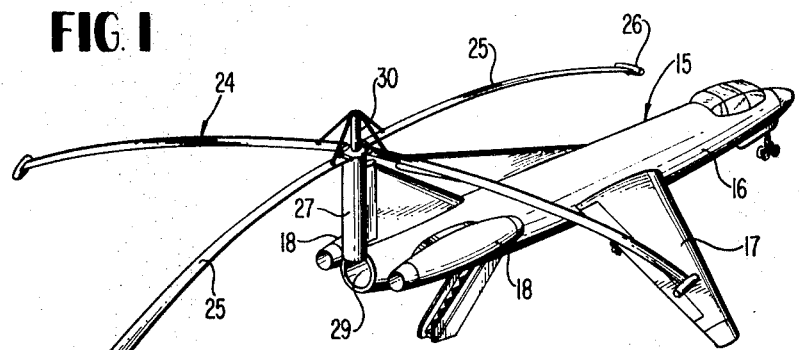
FIG. 1 is a perspective view of a vertical takeoff and landing aircraft as it would appear on the ground.

Referring to the drawings in detail wherein like numerals designate like parts throughout the same, the numeral 15 designates generally a fixed wing aircraft, such as a jet propelled passenger airliner capable of flight speeds at least in the 500—600 miles per hour range while equipped with the invention. It should be stressed that this speed capability represents one of the most important features of the invention in contrast to many of the prior art vertical takeoff and landing aircraft where normal flight speed has been greatly reduced or sacrificed in order to achieve the vertical movement capability. Such is not the case with the present invention.

The aircraft 15 is generally conventional and has a fuselage 16, fixed wings 17, conventional tail assembly, and jet engines 18. The invention is not limited, however, to the particular aircraft configuration shown in the drawings and is applicable to a number of conventional types of aircraft now in use or to be used in the foreseeable future. A conventional underwing landing gear 19 is provided, as well as a retractable nose wheel assembly 20 and other conventional features.

A departure from the conventional is that the pilot's seat or compartment 21 is preferably swiveled within the fuselage on a transverse horizontal axis so that the pilot will remain in a level attitude regardless of the attitude of the aircraft and this is shown clearly in the drawings. The entire pilot's compartment may be weighted as at 22 pendulum-fashion below the pivot 21' to assure this level attitude. The passenger seats 23 within the fuselage 16 face rearwardly at all times and are rigidly mounted for safety. During vertical lift, FIG. 4, the passengers rest comfortably on their backs and are subjected to no particular strain, during the relatively short period of vertical lift at takeoff or vertical descent at landing.

The invention further comprises a tail mounted aircraft lifting rotor 24 having rotary blades or wings 25 equipped with tip reaction nozzles 26 which power the rotor. The rotor 24 is bodily mounted upon a mast 27 having its lower end pivoted to the tail of the aircraft 15 on a transverse pitch axis 28 which allows the mast to pivot ninety degrees with respect to the fuselage 16 between the positions of FIG. 2 and FIG. 4. The mast 27 may be equipped with conventional means to releasably lock it in the position of FIG. 2 at right angles to the fuselage 16 and upon release of the lock the mast and aircraft are freely articulated. Propulsion gases generated in the main engines 18 are conventionally ducted from these engines through the mast 27 and through the rotor blades 25 to the tip motors or reaction nozzles 26 and such ducting and the valving incidental thereto is largely conventional and well within the skill of the artisan.

The rotor blades 25 are adapted to fold upwardly and at the proper time completely collapse for retraction into a longitudinal storage chamber of tube 29 in the upper portion of the fuselage above the passengers. This storage compartment is rear opening, as shown. As will be described and as depicted in FIGS. 5 through 7, the entire folded rotor 24 and its mast 27 are adapted to be retracted as a unit longitudinally into the storage compartment 29 during normal level flight and at this time the configuration of the aircraft is substantially conventional. The rotor 24 is equipped with conventional cyclic and collective pitch controls well known in the art particularly with relation to helicopter rotors and these controls allow for directional flight as well as variation of blade pitch when the aircraft is vertically suspended, FIG. 4.

The invention is not restricted to one particular rotor design and suitable upwardly folding rotors are known in the art and are exemplified by U.S. Pat. No. 3,143,323 and No. 3,194,519. Also the means to extend and retract the rotor and mast relative to the longitudinal compartment 29 can be conventional and such means are well within the knowledge of the artisan.

OPERATION

Figure 2:
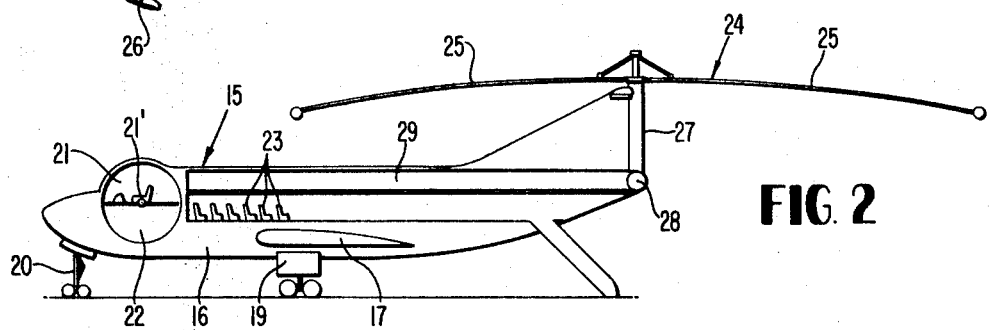
FIG. 2 is a partly diagrammatic side elevation of the aircraft.
Figure 3:
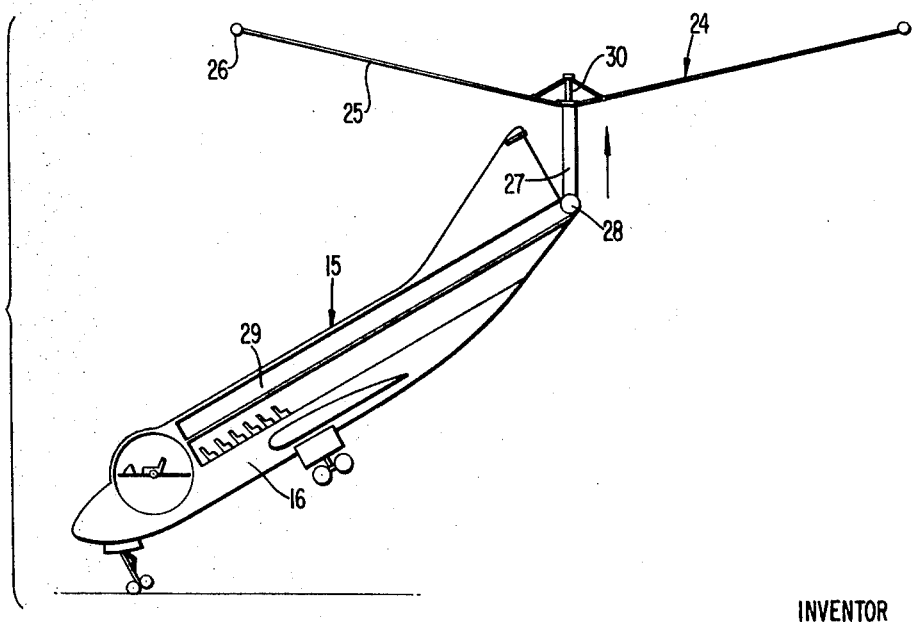
FIG. 3 is a further side elevational view of the craft at the beginning of takeoff under influence of the lifting rotor.

While the aircraft is on the ground, the rotor mast 27, FIG. 2, is locked in the vertical position and the rotor blades 25 are essentially horizontal. On takeoff, all jet engine thrust is directed through the rotor blades 25 to the tip nozzles 26. As the rotor 24 begins to lift, the pivoted mast 27 becomes unlocked. The aircraft is now allowed to seek its own center of gravity beneath the rotor center of lift and a sequence of positions is illustrated in the takeoff operation between FIGS. 2, 3 and 4. As the aircraft clears the ground, FIG. 4, the rotor 24 remains horizontal while the aircraft fuselage 16 has now changed its position ninety degrees relative to the mast 27 and is coaxial therewith. The aircraft now free-hanging and freely articulated on the pivot axis 28. After the aircraft is elevated to a sufficient height by the rotor 24 for due safety, conversion to normal horizontal wing borne flight is accomplished, in essence, by letting the aircraft fall and pull out of a dive, FIG. 5.

More specifically, the procedure from converting to horizontal flight may be outlined as follows. The rotor blade pitch is reduced and power to the rotor tip nozzles 26 is also reduced. Following this, all power to the rotor is stopped and the rotor is put into autorotation. Substantially simultaneously thrust is redirected to the forward propulsion engines 18 by conventional ducting and valving. Rotor blade pitch is increased toward the feather angle to gradually slot it up, and as the blades 25 slow down, they are folded back as shown in FIG. 5 and the coning angle of the rotor gradually increases with the resultant loss in lift caused by the rotor and the aircraft falls increasingly faster in its dive while power is being delivered in the normal manner as thrust from the engines 18. The aircraft is pulled out of its descent by regular controls and is flown as a fixed wing craft. The folded rotor 24 including the mast 27 and hub structure is retracted forwardly into the rear opening chamber 29, FIGS. 6 and 7, and is stored in a longitudinal position relative to the fuselage 16, above and clear of the passenger compartment. In the folding and unfolding operation for the rotor blades 25, their coning angle can be controlled by a linear actuator 30 above the rotor mast 27. This actuator can be constructed to allow the necessary individual blade flopping movement while the rotor is in use to lift the aircraft. The necessary structure is disclosed in U.S. Pat. No. 3,143,323, previously mentioned. The rotor 24 may also be equipped with a conventional brake. Furthermore, the rotor can be designed for windmilling to provide the needed drag during aircraft descent. Air flowing up through the bottom of the partly folded rotor will tend to cause its blades to move to maximum negative pitch angle so that the rotor will windmill in the same direction as in powered flight and autorotation by a combination of the usage of the linear actuator 30 to control the blade coning angle, and the rotor brake, the degree of negative blade pitch for windmilling, and the amount of drag caused by the rotor can be regulated for the control of descent when converting to and from winged horizontal flight.

To convert from horizontal flight back to vertical flight for descent on the rotor 24, the flight procedure is simply reversed. Power is cut to the forward thrust jet engines 18 slowing the aircraft as it starts to descent from a relatively high altitude. The rotor 24 is extended rearwardly from the compartment 29 or chamber and the actuator 30 is used to begin the unfolding of the blades 25. This creates drag, further slowing the aircraft, and starts the windmilling of the rotor and increases the descent angle of the aircraft. The blades 25 are further extended by centrifugal force and/or the action of the linear actuator 30, and power begins to be diverted from the engines 18 to the rotor nozzles 26. The rotor blade pitch is changed via collective pitch control to the proper positive pitch angle to supply lift for normal powered operation. Autorotation is used whenever needed. The aircraft 15 is now fully supported by the rotor 24 with the fuselage 16 in a substantially vertical position and the aircraft flight in this position is now controlled by the conventional collective and cyclic pitch rotor controls. When the aircraft nose touches the ground, the tail of the craft is laid down in the desired location by the use of the rotor controls and the rotor mode yaw control until the fuselage is substantially horizontal on the ground. Before power to the rotor is cut off, the mast 27 is locked in the vertical position, FIG. 2, to prevent the mast from flopping over by rotation of the free-floating rotor-to-aircraft pitch axis 28 or swivel.

Without further description of the structure and its operation, it has now been made clear that a vertical takeoff and landing aircraft has been provided which, to a great extent, resembles a regular jet airliner in its passenger capacity, comfort, speed capability and maneuverability. The vertical takeoff and landing capability of the craft is based on the employment of a single tail-mounted helicopter-type lifting rotor which has free pivotal connection with the craft through a mast structure on a transverse pitch axis, as fully explained. The foldable rotor is drawn totally inside of the fuselage in a special rear opening storage compartment during regular flight. The many advantages of the invention over the prior art will now be readily understood by those skilled in the art.

No special mention has been made of means for effecting yaw or directional control of the aircraft while flying on the rotor 24. There are many conventional methods and means in existence for yaw control with this type of rotor and such means form no part of the present invention and any suitable conventional arrangement for yaw control may be adopted under the invention.

It is to be understood that the form of the invention herewith shown and described is to be taken as a preferred example of the same, and that various changes in the shape, size and arrangement of parts may be resorted to, without departing from the spirit of the invention.

I claim:

1. A vertical takeoff and landing aircraft convertible to horizontal flight comprising an aircraft fuselage having fixed sustaining wings and forward thrust engine means thereon, a lifting rotor swiveled to the tail of the aircraft on a transverse pitch axis and having folding rotor blades, actuator means connected with said blades to fold and unfold the same, and said aircraft fuselage having a longitudinal rear opening rotor storage compartment into which the lifting rotor may be totally retracted after takeoff and when the aircraft is converting to normal level flight.

2. The structure of claim 1, and a swiveled pilot compartment on the fuselage which maintains the pilot in a level attitude during all angular positions of the fuselage during takeoff, normal flight and landing.

3. The structure of claim 1, and said lifting rotor having a mast section directly swiveled to the tail of the fuselage and supporting the rotor blades and actuator means.

4. The structure of claim 3, and said actuator means for folding and unfolding the rotor blades is a linear actuator substantially coaxial with the mast section.

5. The structure of claim 1, and said fuselage having a longitudinal passenger compartment extending through a major portion of its length and said rotor storage compartment being another longitudinal compartment above and separated from the passenger compartment.

6. The structure of claim 5, and rear facing passenger seats in said passenger compartment enabling passengers to rest comfortably on their backs during vertical takeoff and landing.

7. The structure of claim 1, and said lifting rotor being a helicopter-type lifting rotor with conventional collective and cyclic pitch controls, and blade tip reaction nozzles on the rotor blades to run the rotor during aircraft landing and takeoff operations.

8. The structure of claim 7, and said lifting rotor having a supporting mast directly swiveled to the tail of the aircraft on said pitch axis and being swingable substantially ninety degrees relative to the fuselage between a first position substantially perpendicular thereto and a second position substantially coaxial therewith.

9. The method of executing a generally vertical takeoff followed by substantially horizontal flight with an aircraft having a fuselage which is substantially level when the aircraft is at rest on the ground, fixed wings, forward thrust propulsion means, and a single lifting rotor articulated with the tail of the aircraft fuselage, comprising the steps of tilting the tail of the aircraft fuselage upwardly from an initially level position when the aircraft is on the ground and in so doing pivoting the aircraft fuselage about its nose while the latter is still in contact with the ground, lifting the aircraft bodily from the ground by its tail through the operation of the lifting rotor after said tilting and pivoting with the aircraft freely suspended substantially vertically, elevating the aircraft to a substantial height while suspended from said rotor, allowing the aircraft to fall in a substantially vertical dive and to pull out of said dive into a substantially level flight attitude with the aircraft then sustained by said fixed wings, and substantially simultaneously gradually terminating the operation of said rotor and collapsing the rotor and retracting it bodily inside of the aircraft fuselage longitudinally of the fuselage and then utilizing said forward thrust propulsion mean to power the aircraft in generally level flight.

10. The method of operating an aircraft comprising lifting an aircraft from an initial substantially horizontal position on the ground by its tail to swing the tail upwardly from the ground until the aircraft assumes a generally vertical attitude, elevating the aircraft bodily while in said vertical attitude to a substantial height above the ground, and allowing the aircraft to drop in a generally vertical dive and to pull out of said dive into a substantially level flight attitude and then powering the aircraft in the level flight attitude.

11. The method of operating an aircraft comprising lifting an initially substantially horizontal aircraft from the ground by its tail until the aircraft is in a substantially vertical attitude and elevating the aircraft in such attitude to a substantial height above the ground, allowing the aircraft to fall in a generally vertical dive and to pull out of the dive into a substantially level flight attitude and powering the aircraft while in the level flight attitude, landing the aircraft in a substantially vertical mode by first reducing the power on the aircraft in level flight so that it begins to descend in an inclined attitude, applying a restraining and gradually increasing lifting force to the tail of the descending aircraft to slow its descent and increase its inclination gradually until the aircraft is substantially vertical, lowering the aircraft in a vertical attitude toward the ground with decreasing velocity until the nose of the aircraft touches the ground, and then lowering the tail of the aircraft until the aircraft is in a generally horizontal attitude on the ground.